UNITED STATES PATENT OFFICE.

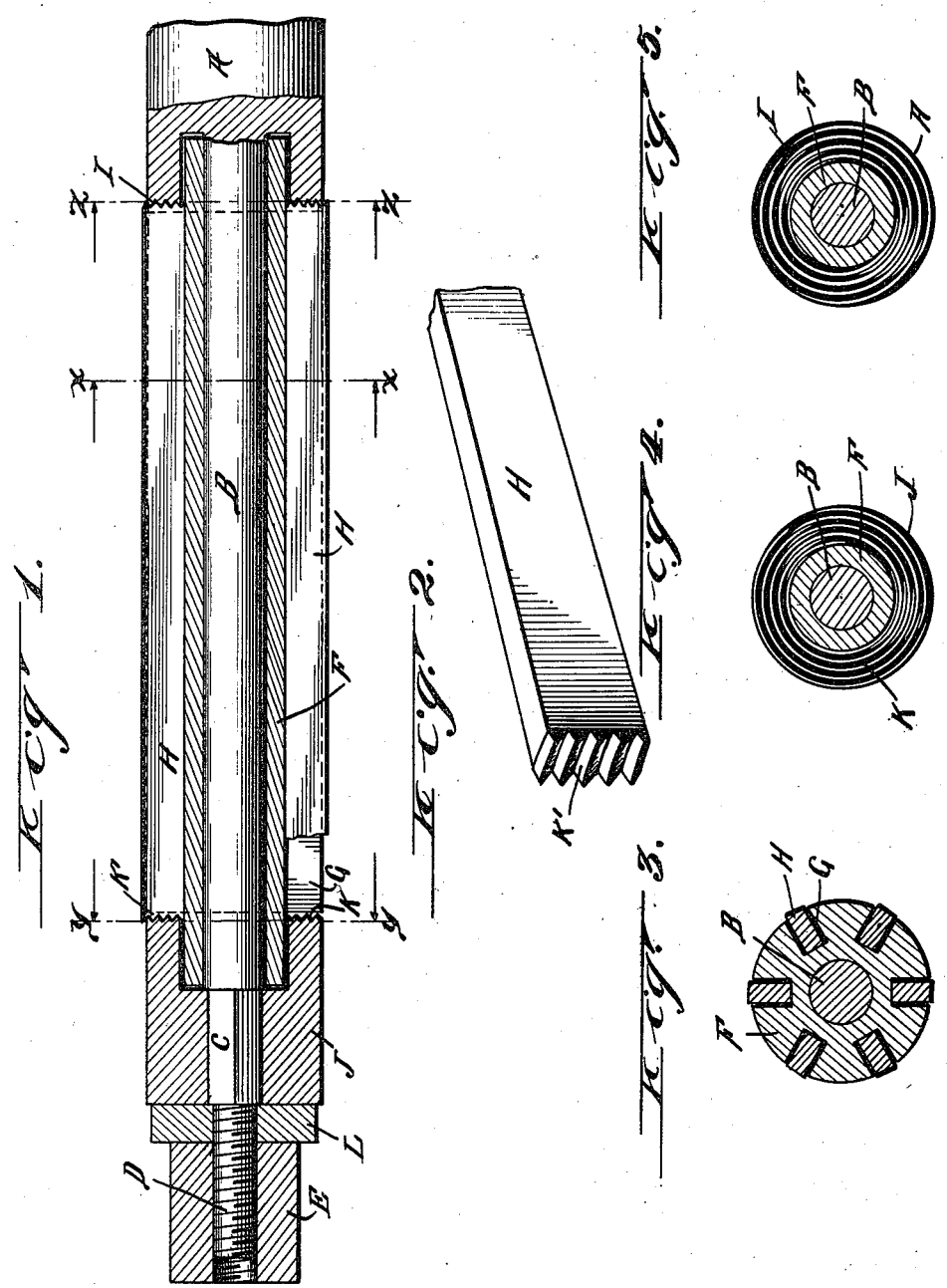

EUGENE FERENCIK, OF WEST ALLIS, WISCONSIN.

EXPANSION-REAMER.

1,000,503. Specification of Letters Patent. Patented Aug. 15, 1911.

Application filed October 17, 1910. Serial No. 587,427.

*To all whom it may concern:*

Be it known that I, EUGENE FERENCIK, a citizen of the United States, residing at West Allis, county of Milwaukee, and State of Wisconsin, have invented new and useful Improvements in Expansion-Reamers, of which the following is a specification.

My invention relates to improvements in expansion reamers.

The object of my invention is to provide a form of construction in which the cutting blades of an expansion reamer may be accurately and uniformly adjusted along radial lines throughout the length of the blade.

A further object of my invention is to provide a form of construction, which will be inexpensive and durable, and in which the number of parts will be reduced to a minimum.

In the following description, reference is had to the accompanying drawings, in which—

Figure 1 is a view in longitudinal section of the lower end portion of an expansion reamer, embodying my invention. Fig. 2 is a detail perspective view of one end of one of the cutting blades, showing the screw threads. Fig. 3 is a cross sectional view, drawn on line x—x of Fig. 1. Fig. 4 is a cross sectional view, drawn on line y—y of Fig. 1, showing the threaded end of the removable blade actuating member. Fig. 5 is a sectional view, drawn on line z—z of Fig. 1, showing the threaded abutment or shoulder of the spindle.

Like parts are identified by the same reference characters throughout the several views.

The spindle A is provided with a lower end portion B of reduced diameter. This reduced portion is squared at C, below which the spindle is still further reduced and threaded, as illustrated at D, to receive an end nut E. A blade holder, such as a sleeve F, is mounted upon the portion B of the spindle, and is provided with longitudinally extending channels G in its periphery, adapted to receive the blades H. The spindle A is provided with a shoulder at I, having a screw threaded face adapted to engage corresponding threads upon the abutting ends of the blades H. A removable member J is adjusted to the squared portion C of the spindle and is provided with an inner threaded face at K, adapted to engage the screw threaded ends K' on the blades H. These screw threads, however, trend in the opposite direction from those on the shoulder I, so that a relative rotation of the sleeve F with reference to the spindle, will cause the blades to move at both ends along radial lines and in the same direction, the adjustment being outward or inward, according to the direction in which the sleeve F rotates. The threads on the shoulder I are preferably left hand threads and those on the inner end of the member J, right hand threads.

The inner portion of the sleeve F preferably extends beyond the ends of the blades H and is socketed in the spindle A under the shoulder I, and in the inner portion of the member J, but that part of the sleeve F, which is channeled, to receive the blades H, is somewhat shorter than the blades, so that it will not bear upon the screw threads on the shoulder I and member J.

In operation, the blades are adjusted to the desired position by loosening the nut E and turning the blade holder sleeve F relatively to the spindle. When the desired adjustment is secured, the nut E is tightened so as to cause the screw threads of the spindle and member J to bind upon the threads at the ends of the blades H. The binding pressure of these threads is sufficient to prevent any change of the adjustment, while the tool is in use. A washer L is preferably interposed between the nut E and the member J, but this is not essential.

Having thus described my invention, what I claim as new, and desire to secure by Letters Patent, is—

1. An expansion reamer comprising the combination of a longitudinally channeled blade holder, a set of blades mounted in the holder channels and projecting therefrom at their respective ends, a set of reversely threaded members having threaded engagement with the ends of the blades, and a spindle connected to rotate with said members; said blade holder being supported for independent rotation on the spindle.

2. An expansion reamer, comprising the combination of a spindle having a shoulder and a reduced extension beyond the shoulder, squared at its outer end, a removable member in slip joint connection with the squared portion of the spindle, a sleeved blade holder mounted upon the spindle between the shoulder and said member, and blades mounted in the blade holder, and extended at their ends into threaded engagement with the shoulder and said member respectively, said shoulder and removable member being reversely threaded, whereby a relative rotation of the blade holder may actuate the blades equally at both ends and in the same direction along radial lines.

3. An expansion reamer, comprising the combination of a spindle having a shoulder and a reduced extension beyond the shoulder, squared at its outer end, a removable member in slip joint connection with the squared portion of the spindle, a sleeved blade holder mounted upon the spindle between the shoulder and said member, and blades mounted in the blade holder, and extended at their ends into threaded engagement with the shoulder and said member respectively, said shoulder and removable member being reversely threaded, whereby a relative rotation of the blade holder may actuate the blades equally at both ends and in the same direction along radial lines, together with a nut at the extremity of said shank adapted to bind the removable member against the ends of the blades to prevent rotation of the blade holder after the blades are adjusted.

In testimony whereof I affix my signature in the presence of two witnesses.

EUGENE FERENCIK.

Witnesses:
   JOSEF B. MEGYERY,
   JOSEF SCHINKOWITZ.